US006531680B2

(12) United States Patent
Tomlinson et al.

(10) Patent No.: US 6,531,680 B2
(45) Date of Patent: Mar. 11, 2003

(54) CUBE CORNER LASER BEAM RETROREFLECTOR APPARATUS FOR A LASER EQUIPPED MACHINE TOOL

(75) Inventors: Michael A. Tomlinson, Roscoe, IL (US); Steven A. Tower, Roscoe, IL (US)

(73) Assignee: W. A. Whitney Co., Rockford, IL (US)

( * ) Notice: Subject to any disclaimer, the term of this patent is extended or adjusted under 35 U.S.C. 154(b) by 79 days.

(21) Appl. No.: 09/827,516

(22) Filed: Apr. 6, 2001

(65) Prior Publication Data

US 2002/0144987 A1 Oct. 10, 2002

(51) Int. Cl.[7] .......................... B23F 26/02; G02B 5/122

(52) U.S. Cl. .................. 219/121.74; 359/529; 359/861; 359/872

(58) Field of Search ................................ 359/529, 861, 359/862, 872; 219/121.74, 121.78, 121.79

(56) References Cited

U.S. PATENT DOCUMENTS

| | | | | |
|---|---|---|---|---|
| 3,327,243 A | | 6/1967 | Stickley | 331/94.5 |
| 3,397,024 A | | 8/1968 | Boyden et al. | 350/199 |
| 3,414,835 A | | 12/1968 | Miller | 331/94.5 |
| 3,464,026 A | | 8/1969 | Woodbury et al. | 331/94.5 |
| 3,574,448 A | * | 4/1971 | Petersen et al. | |
| 3,855,547 A | | 12/1974 | Kirk | 331/94.5 |
| 3,993,402 A | * | 11/1976 | Fredrick, Jr. | |
| 3,995,230 A | | 11/1976 | See | 331/94.5 |
| 4,050,035 A | | 9/1977 | Wuerker et al. | 331/94.5 |
| 4,099,141 A | | 7/1978 | Leblanc et al. | 331/94.5 |
| 4,277,142 A | * | 7/1981 | Gardner | |
| 4,292,602 A | | 9/1981 | Bergqvist | 331/94.5 |
| 4,677,639 A | | 6/1987 | Sasser | 372/93 |
| 4,751,720 A | | 6/1988 | Koop | 372/99 |
| 5,053,602 A | * | 10/1991 | Aharon | 219/121.78 |
| 5,089,683 A | | 2/1992 | Stephenson et al. | 219/121.78 |
| 5,231,264 A | * | 7/1993 | Fujita | 219/121.78 |
| 5,237,151 A | | 8/1993 | Maruyama | 219/121.78 |
| 5,251,221 A | | 10/1993 | Stultz et al. | 372/3 |
| 5,289,493 A | | 2/1994 | Fink | 372/94 |
| 5,406,048 A | | 4/1995 | Yamazaki et al. | 219/121.78 |
| 5,504,630 A | * | 4/1996 | Hansen | 219/121.78 |
| 5,513,205 A | | 4/1996 | Rubinstein | 372/99 |
| 5,589,991 A | * | 12/1996 | Bleier | 359/861 |
| 5,912,447 A | * | 6/1999 | Bjorner et al. | 359/862 |
| 6,003,997 A | * | 12/1999 | Downes, Jr. | 359/861 |
| 6,034,805 A | * | 3/2000 | Lai | 359/872 |
| 6,296,362 B1 | * | 10/2001 | Tinti et al. | 359/872 |
| 6,313,433 B1 | * | 11/2001 | Sukman et al. | 219/121.78 |

* cited by examiner

*Primary Examiner*—Geoffrey S. Evans
(74) *Attorney, Agent, or Firm*—Leydig, Voit & Mayer, Ltd.

(57) ABSTRACT

A cube corner laser beam retroreflector apparatus for a beam path external to a laser reduces the effect of small deviations in flatness of optical carriage mounting elements and/or linear ways that pitch, yaw and roll the carried retroreflector apparatus. Small changes in pitch, yaw and roll are converted to a small translation in position of the beam reflected from the apparatus. Since the reflected beam remains parallel to the incoming beam, the length of the beam path does not magnify such small deviations in position and system pointing stability is greatly improved. The cube corner retroreflector comprises a welded frame and three mirror holders, the welded frame consisting of plasma, laser or abrasive water jet cut tabbed and slotted flat plates welded together. Each mirror holder is adjustably attached to the welded frame and houses a removable mirror. Each mirror holder is preset to establish an orthogonal relationship between the mirrors, and adjusting devices are locked before installation of the cube corner retroreflector in a beam path.

32 Claims, 7 Drawing Sheets

17
49
23
3
4
5
18
50
19
51
6
6

7 7

CUBE CORNER LASER BEAM RETROREFLECTOR APPARATUS FOR A LASER EQUIPPED MACHINE TOOL

FIELD OF THE INVENTION

The present invention generally relates to machine tools, and more particularly relates to laser equipped CNC machine tools having long laser beam paths and that are used to cut and weld parts from carbon steels, stainless steel and aluminum.

BACKGROUND OF THE INVENTION

Flying optic and cantilever type CNC laser cutting and welding machines with cutting areas of two meters by 4 meters and above have long beam paths, the distance between the laser and the focal optic, exceeding 8 meters in length. Individual sections of the beam path can exceed 6 meters in length. Such machines also may have an optical carriage having a short wheelbase, the distance between linear bearings on a common linear way. For example, an optical carriage may be used for the purpose of maintaining a constant length beam path, as opposed to a variable length beam path between the laser and the cutting nozzle.

When a short wheelbase exists, small deviations in flatness of machine mounting elements and/or of the linear way raceways cause angular deviation in pointing of a laser beam by slightly pitching, yawing, or rolling the carried reflecting mirror as the optical carriage traverses the linear ways from end to end. Small angular deviations are magnified by a long beam path length (deviation=distance between reflecting mirror and the next impinging mirror times the tangent of the change in reflection angle) and can be a source of significant error when a laser beam impinges on a mirror or a lens several meters from the reflecting mirror. Such errors cause the laser beam to impinge on and be reflected from a different position on the mirror than intended. As a result, further along the laser beam path, a focused beam will shift from its centered position within a cutting nozzle or a welding head thus causing degradation of cutting quality, of part accuracy, of weld position or weld quality.

Optical cube corner retroreflectors have a characteristic that any radiation ray entering its end face will be totally internally reflected and will emerge from the end face parallel to itself, but with the opposite direction of propagation. This property is, within acceptable angle ranges, independent of the precise orientation of the retroreflector. Many examples have been found of cube corner retroreflectors used internally to a laser resonator for some purpose. No example has been found of a cube corner retroreflector used to improve pointing stability of a laser beam in a beam path external to a laser resonator.

SUMMARY OF THE INVENTION

It is an objective of the invention to provide a cube corner laser beam retroreflector apparatus that will reduce the effect of small deviations in flatness of optical carriage mounting elements and/or linear ways that pitch, yaw and roll the carried retroreflector apparatus. Inventor testing of such an apparatus reveals significant improvement in the pointing stability of a laser beam reflected by the apparatus. Small changes in pitch, yaw and roll are converted to a small translation in position of the beam reflected from the apparatus. However, since the reflected beam remains parallel to the incoming beam, the length of the beam path does not magnify such small deviations in position and system pointing stability is greatly improved.

It is another objective of the invention to provide a cube corner device, for a beam path external to a laser, which is composed of three orthogonal removable mirrors.

It is a further objective of the invention to provide a laser beam retroreflector apparatus consisting of three adjustable mirrors that are preset to orthogonal relationship to each other before introduction into a beam path.

It is another objective of the invention to provide a cube corner device mirror holding frame, for a beam path external to a laser, which can be fabricated of laser cut tabbed and slotted parts that are welded together.

Figure 1:
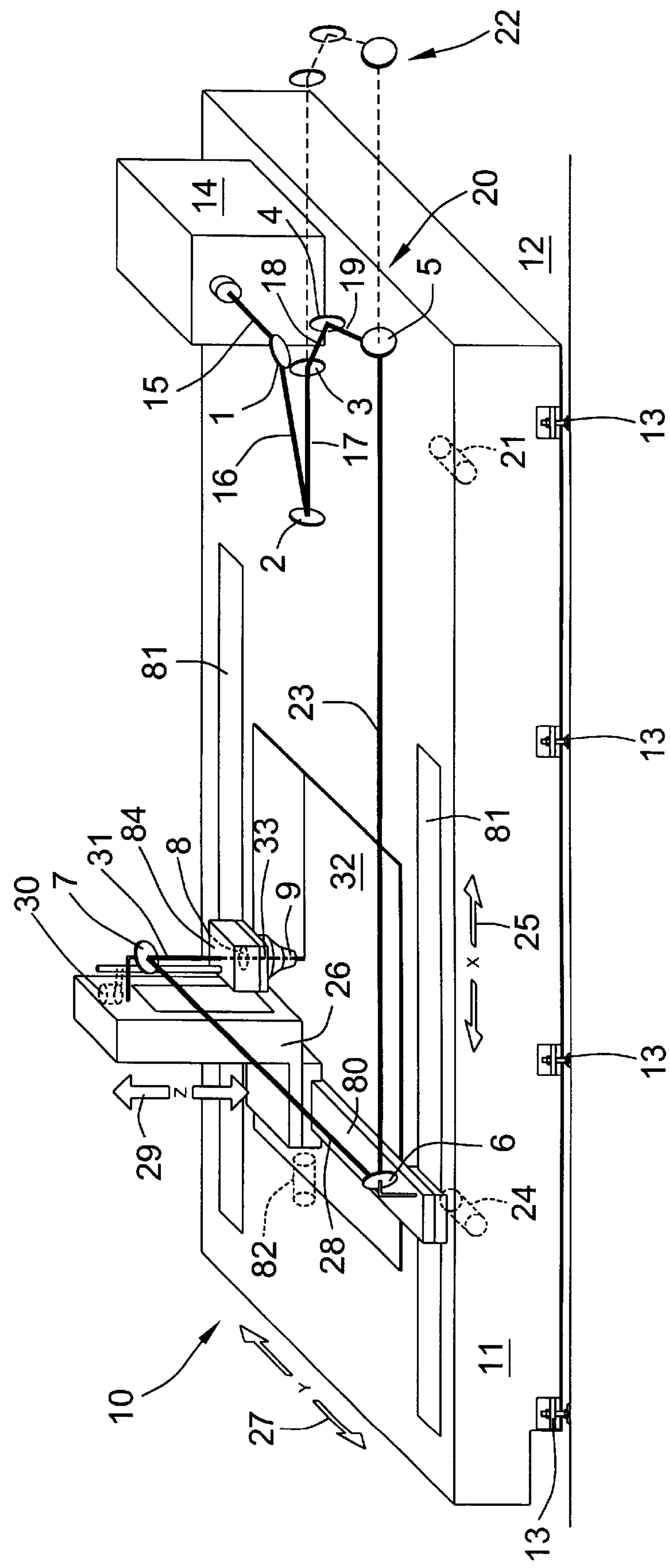
FIG. 1 is a diagram in somewhat schematic form showing a laser equipped machine tool, for cutting metals, and incorporating a preferred embodiment of the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims. Also it is noted that when used herein, references to "cut", "cutting", "cutting head" and "cutting machine" are meant to be inclusive of "weld", "welding", "welding head", and "welding machine", unless the context clearly indicates otherwise.

DETAILED DESCRIPTION OF THE PREFERRED EMBODIMENT

FIG. 1 is a diagram of a laser equipped machine tool 10, for cutting metals, and incorporating a preferred embodiment of the invention. Machine tool 10 is shown in greatly simplified, somewhat schematic form, for emphasizing the invention, but very adequately for those experienced in the art of designing such machines. Machine tool 10 has a base 11 supported on floor 12 by several leveling screws 13. Laser 14 is mounted on base 11 and emits a laser beam 15 that impinges on first mirror 1 and then is reflected therefrom along path 16 to impinge on second mirror 2. The beam path of such machines is enclosed in practice and purged with dried and scrubbed air, nitrogen or other gas to maintain cleanliness and to enhance propagation characteristics of the laser beam. Such details are intentionally left out to simplify disclosure of the invention. Mirror 2 may be a curved optic for purpose of determining the size of the laser beam at the focal optic, may be an adaptive optic, a form of a deformable mirror, allowing changing or controlling the size of the beam during machine operation, or may be a flat mirror.

The laser beam is reflected from mirror 2 along path 17 to impinge on third mirror 3, is reflected therefrom along path 18 to impinge on mirror 4 and is reflected therefrom along path 19 to impinge on mirror 5. Mirrors 3, 4 and 5 form a cube corner retroreflector 20, interposed in the beam path and mounted on a short wheelbase translatable carriage, carried on linear ways, not shown in FIG. 1. The short wheelbase carriage is driven by a powered actuator, preferably a servomotor 21, such as to make the length of the beam path between laser 14 and nozzle 9 constant by compensating for the travel of the X, Y, and Z axis. Other types of powered actuators, such as linear servomotors or other programmable actuators, may be utilized, and the schematic showing 21 is intended to encompass all such devices. Travel of the carriage mounted compensation device is set to equal the sum of X, Y, and Z travel divided by two. Since the travel distance of the Z axis is often small, Z axis travel is sometimes ignored. The path of travel of cube corner retroreflector 20 is shown by phantom lines continuing to the right of cube corner retroreflector 20 to position 22.

The purpose and function of a constant beam path length device is well known to persons experienced in the art of designing laser equipped machine tools, and may be embodied in manners differing from that shown here. Cube corner retroreflector 20 reduces the effects of small deviations in flatness of optical carriage mounting elements and/or linear ways that pitch, yaw and roll the carried retroreflector apparatus. Inventor testing reveals significant improvement in the pointing stability of a laser beam reflected by such an apparatus. Small changes in pitch, yaw and roll are converted to a small translation in position of the beam reflected from the apparatus. However, since the reflected beam remains parallel to the incoming beam, the length of the beam path does not magnify such small deviations in position and system pointing stability is greatly improved.

Laser beam 15 is reflected from mirror 5 along path 23 to impinge on mirror 6. Mirror 6 is mounted on the end of a bridge 80, which is carried by linear ways 81, and driven by servomotor 24 along X axis 25. Axis labeling follows normal conventions herein but may be differently labeled in practice. The bridge 80 is established perpendicular to the X axis and forms the supporting structure for purpose of carrying Y axis carriage 26 along Y axis 27 under the control of a Y axis servo motor 82.

Laser beam 15 is reflected from mirror 6 along path 28, perpendicular to X axis 25, parallel to Y axis 27, and impinges on mirror 7 mounted on Y axis carriage 26, above the cutting head 84. Y axis carriage 26, which is driven by servo motor 82, carries the cutting head 84, which is driven in the Z axis 29 by servo motor 30. Laser beam 15 is reflected from mirror 7 along path 31 to focal lens 8, which focuses the beam to a high energy density spot for cutting workpiece 32. Lens 8, in other laser equipped machine tool embodiments, may be one or more curved mirrors for purpose of focusing the laser beam. In the embodiment shown, laser beam 15 passes through focal lens 8 along path 33 through nozzle 9. Lens 8 and cutting nozzle 9 are part of the cutting head 84, which in the preferred embodiment is driven by servomotor 30 to position the nozzle appropriately to cut workpiece 32. In other embodiments servo motor 30 may be another type of actuator such as a air operated cylinder.

Figure 2:
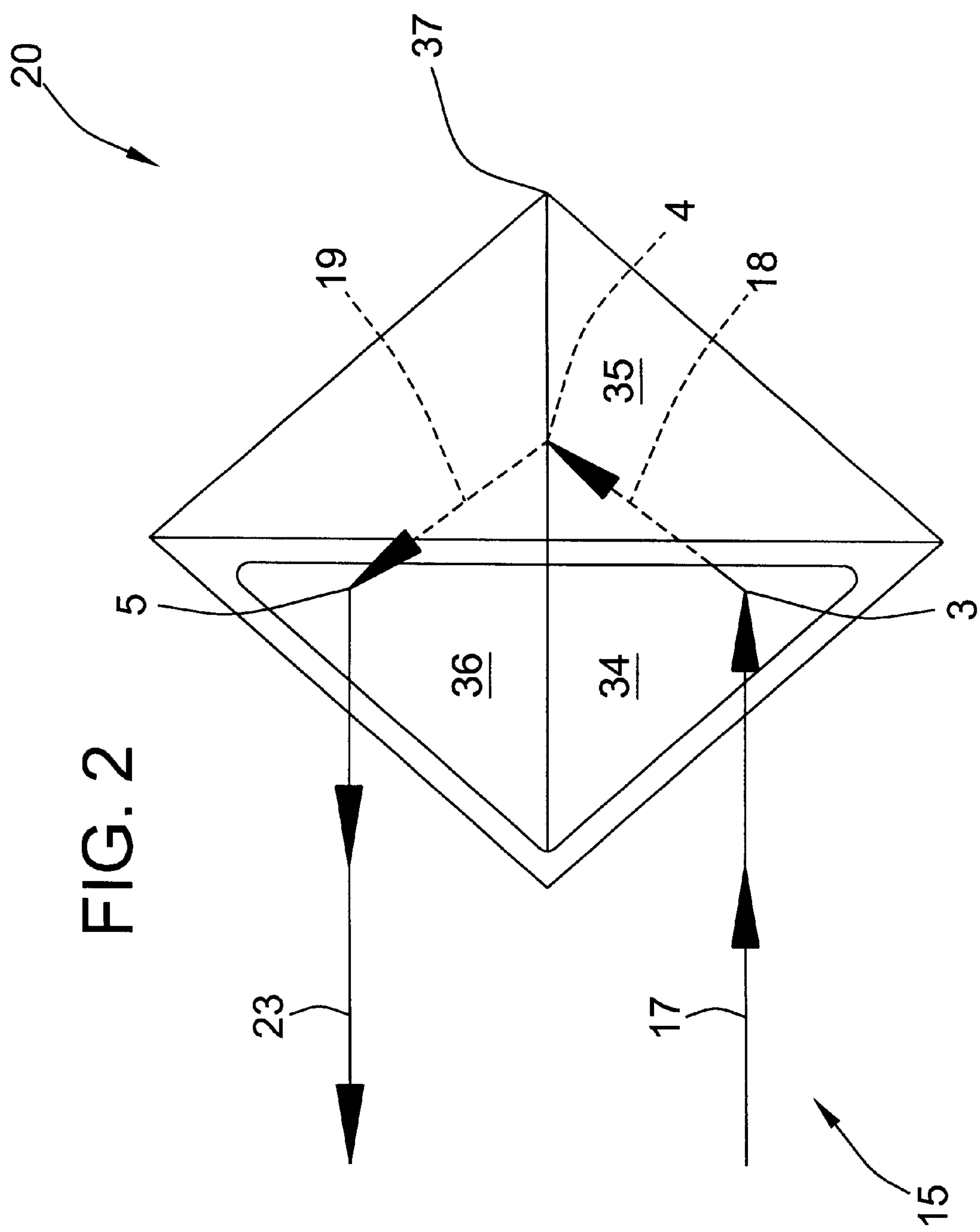
FIG. 2 is a diagram illustrating the principle of a cube corner retroreflective device.

FIG. 2 is a view in space of a typical cube corner retroreflector 20. It comprises three plane faces 34, 35 and 36 in orthogonal relationship forming a tri-rectangular trihedron whose apex is 37. Those faces are made of either glass or metal and are polished on the inside so that the concave surface of the retroreflector is reflecting. If a laser beam 15 traveling along path 17 impinges reflecting face 34 of retroreflector 20 at 3, it is reflected along path 18 to impinge on reflecting face 35 at point 4, where it is reflected along path 19 to point 5 of reflecting face 36, to be reflected along path 23, emerging retroreflector 20 parallel to path 17. It is known that beam path 17 and 23 are parallel to each other, that parallelism being independent, to a large extent, from the angle of incidence of the laser beam traveling along path 17 to the reflecting face 34. In practice, the obtaining of strict parallelism between paths 17 and 23 requires very great accuracy in the forming of the faces of the cube corner retroreflector 20 and would cause a high manufacturing cost.

Figure 3:
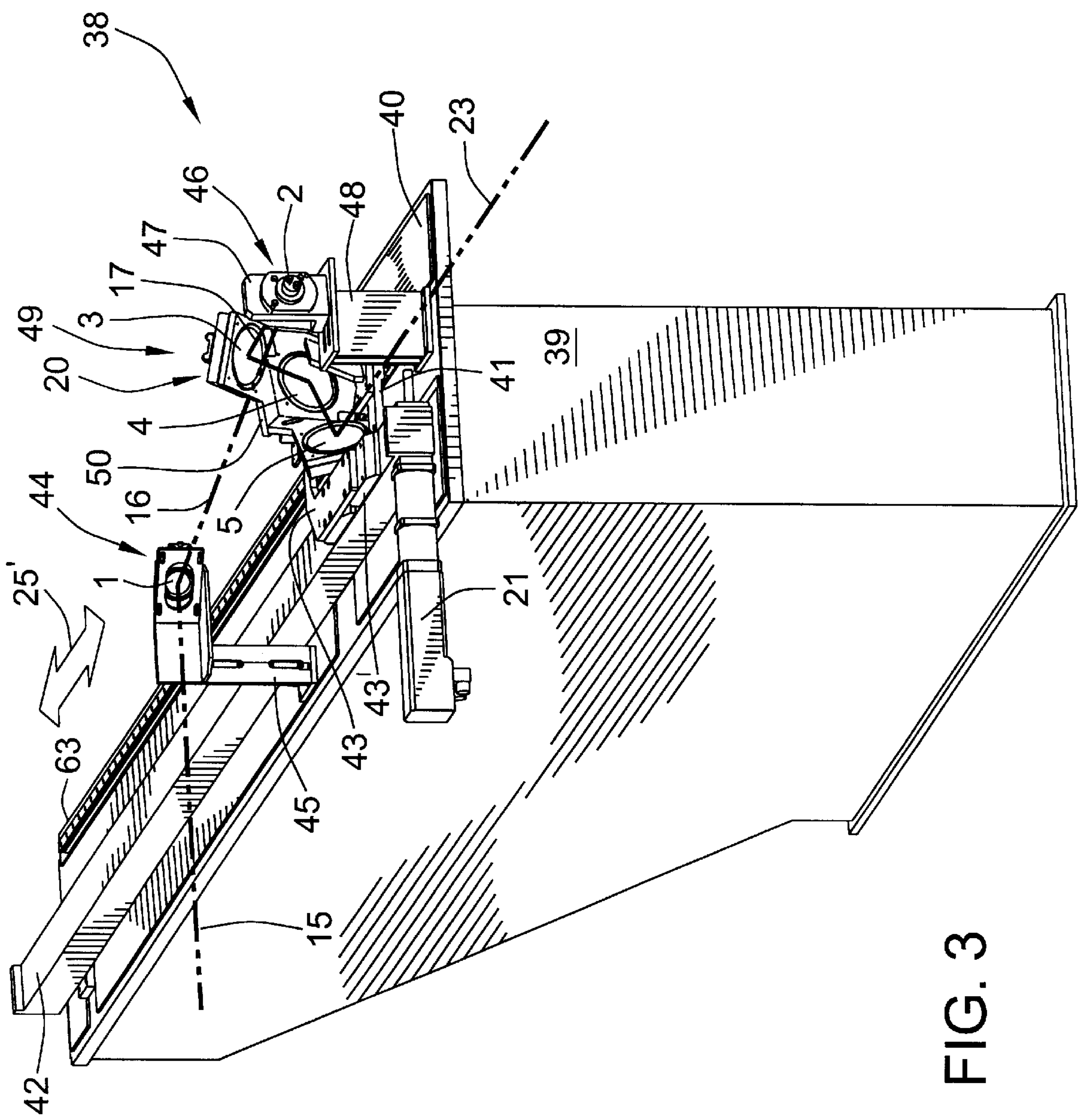
FIG. 3 is a drawing of a constant beam path length device having a short wheelbase optical carriage carrying an embodiment of the invention in preferred form.

FIG. 3 is a drawing of a constant beam path length device 38 having a short wheelbase optical carriage 41 carrying an embodiment of the invention in preferred form. Constant beam path device 38 is suitable for use on a machine tool as disclosed explaining FIG. 1. Elements common with FIG. 1 are labeled with common numbers. Constant beam path length device 38 has a supporting structure 39 having a machined upper surface 40, on which are mounted linear ways 63, one of which can be seen, carrying a short wheel base carriage 41 along an axis identified by double headed arrow 25'. The carriage 41 carries cube corner retroreflector 20 in preferred form. Also mounted on upper surface 40 is a translation device 42, which is driven by servomotor 21 and is attached to carriage 41 by connector 43 for purpose of controllably positioning cube corner retroreflector 20 to maintain the length of the beam path constant. In the preferred embodiment translation device 42 is a commercially available device embodying a timing belt to drive a carriage 43', which in turn can be connected to a device to be driven. Translation device 42 may be embodied as a ballscrew attached to the carriage 41 and driven by a rotary motor. Other commercially available translation devices may also be employed to drive cube corner retroreflector 20.

Laser beam 15 impinges on stationary mirror 1 contained in a housing 44 supported by bracket 45 attached to machined surface 40. Laser beam 15 is reflected from mirror 1 along path 16 to impinge on stationary mirror 2 contained in housing 46 supported by bracket 47 in turn supported by bracket 48 fastened to surface 40. The beam reflected from mirror 2 travels along path 17 to impinge on mirror 3 contained in housing 49 adjustably attached to cube corner reflector frame 50. It is noted that the corners of the cube corner retroreflector frame 50 adjacent mirrors 3 and 5 and opposite mirror 4 have been greatly removed to allow for passage of the incoming laser beam along path 16.

In operation of the machine tool, as the beam path length changes while the cutting head is traversing the workpiece, the optical carriage 41 translates along the axis 25' to maintain the beam length constant. The incoming beam 17, reflecting from stationary optics, is at a given orientation, and the carriage 41 as it translates along the axis 25' may pitch, roll or yaw as described above. The cube corner retroreflector, however, assures that the output beam 23 is always parallel to input beam 17. It will be recalled that the output beam 23 has a rather long length, particularly when the bridge 80 (see FIG. 1) is at a distant position. The avoidance of misalignment of the beam 23 by the cube corner retroreflector assures that the beam will impinge on the mirror 6 on the Y axis carriage at about its intended position, resulting in a much more accurate focusing system than has been provided in the past for such systems.

Figure 4:
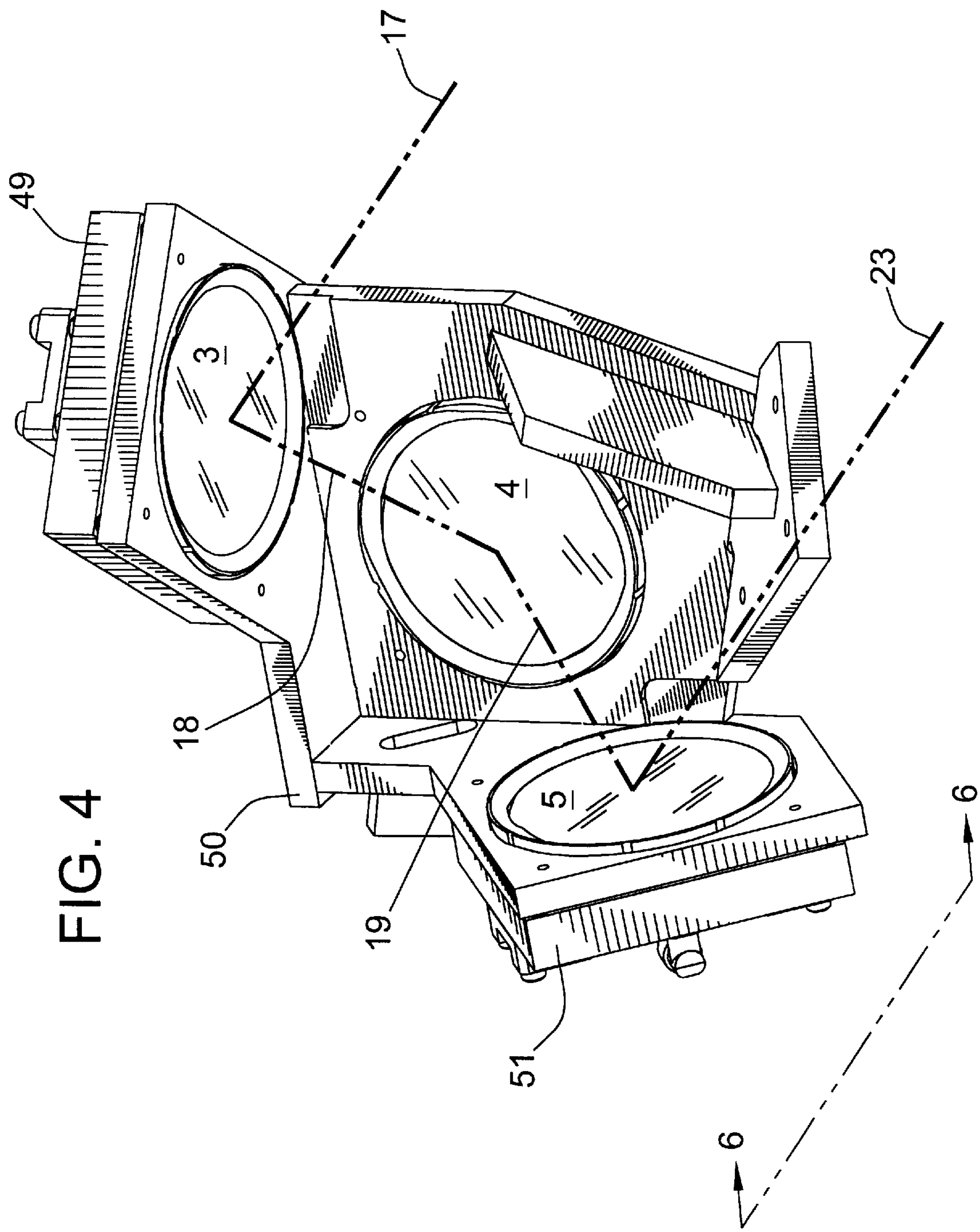
FIG. 4 is an enlarged drawing of the cube corner reflective device of FIG. 3.

Referring to FIG. 4, an enlarged drawing of the cube corner reflective device of FIG. 3, the laser beam is reflected from mirror 3 along path 18 to impinge on mirror 4 contained in a housing, that cannot be seen, which is adjustably connected to frame 50. The beam is reflected from mirror 4 along path 19 to impinge on mirror 5, which is contained in housing 51 that is adjustably connected to frame 50. The laser beam is reflected from mirror 5 along path 23, parallel to but opposite in direction to path 17.

Figure 5:
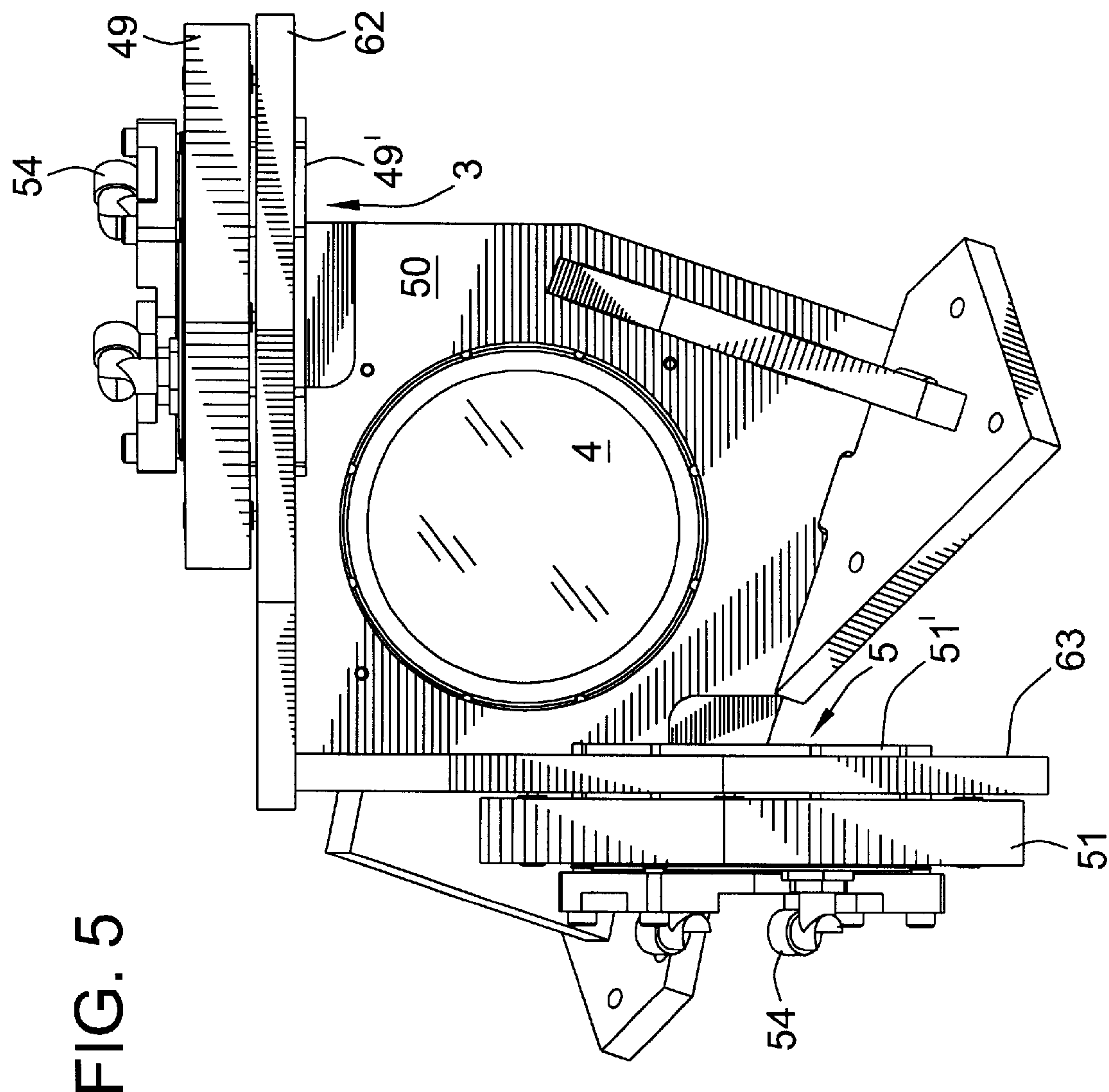
FIG. 5 is view of the cube corner retroreflector device of FIG. 4, from a position perpendicular to mirror 4, showing that mirrors 3 and 5 are perpendicular to mirror 4 and to each other.

FIG. 5 is view of the cube corner retroreflector device of FIG. 4, viewed from a position perpendicular to mirror 4, showing that mirrors 3 and 5 are perpendicular to mirror 4 and to each other.

Figure 6:
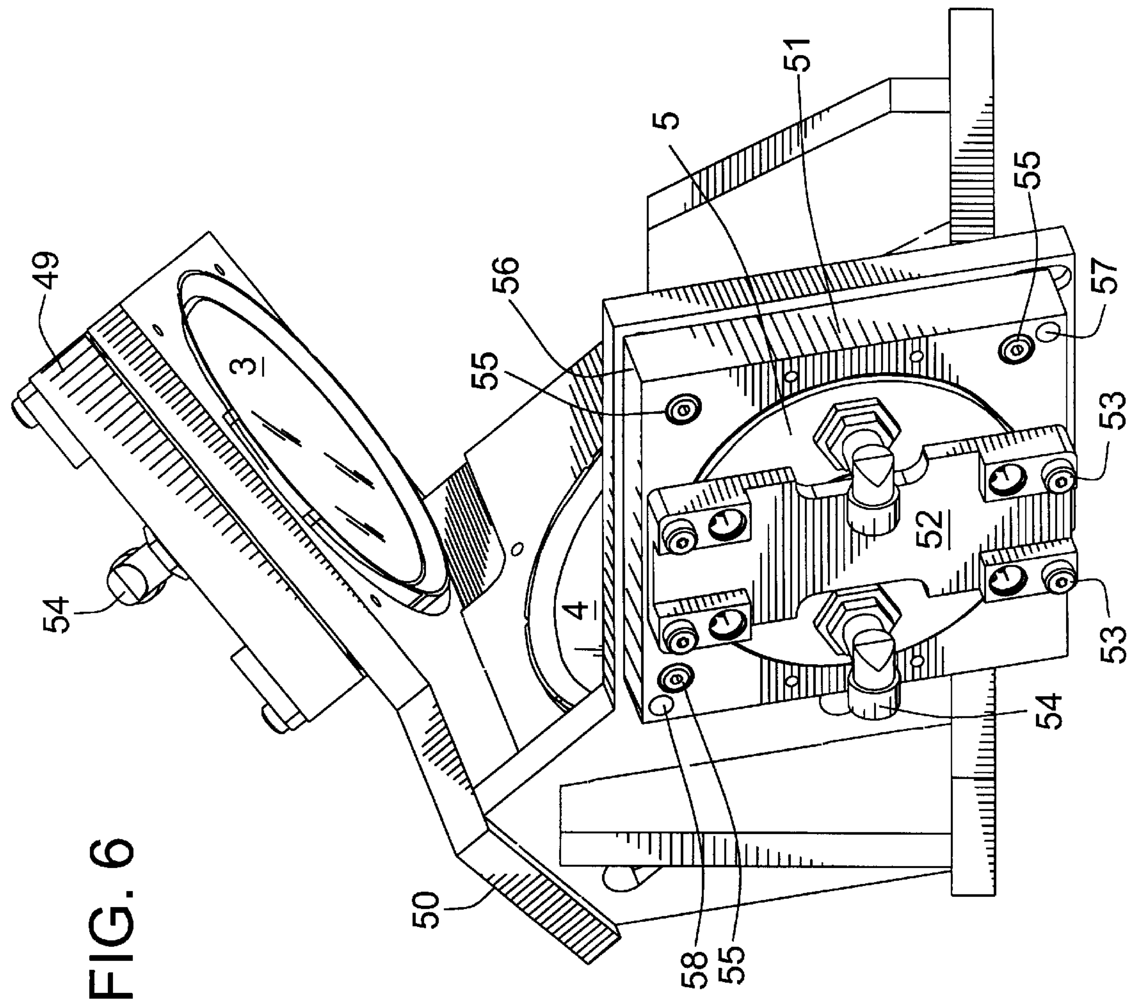
FIG. 6 is a view of the cube corner retroreflector of FIG. 4, taken generally from 6—6 of FIG. 4, showing in greater detail how the mirrors are mounted.

FIG. 6 is a view of the corner cube retroreflector of FIG. 4, taken generally from 6—6 of FIG. 4, showing in greater detail how the mirrors are mounted. Mirror 5 is held in housing 51 by a spring loaded retainer 52 retained by fasteners 53. Spring loaded mirror retainers are employed to assure mirrors are not distorted by retention forces. In preferred form, the mirrors are liquid cooled. Fittings 54 are for purpose of liquid cooling connections. Housing 51 is adjustably attached to frame 50 by three spring-loaded fasteners 55. A pivot device is located proximate corner 56 of mirror housing 51. Adjustors 57 and 58 are provided opposite pivoting corner 56 for adjusting the angle of mirror housing 51 relative to frame 50. This type of mounting apparatus is well known to those experienced in the design of beam benders for steering a laser beam through a beam path. In the preferred embodiment of this cube corner retroreflector, all three mirrors are attached in like fashion.

Figure 7:
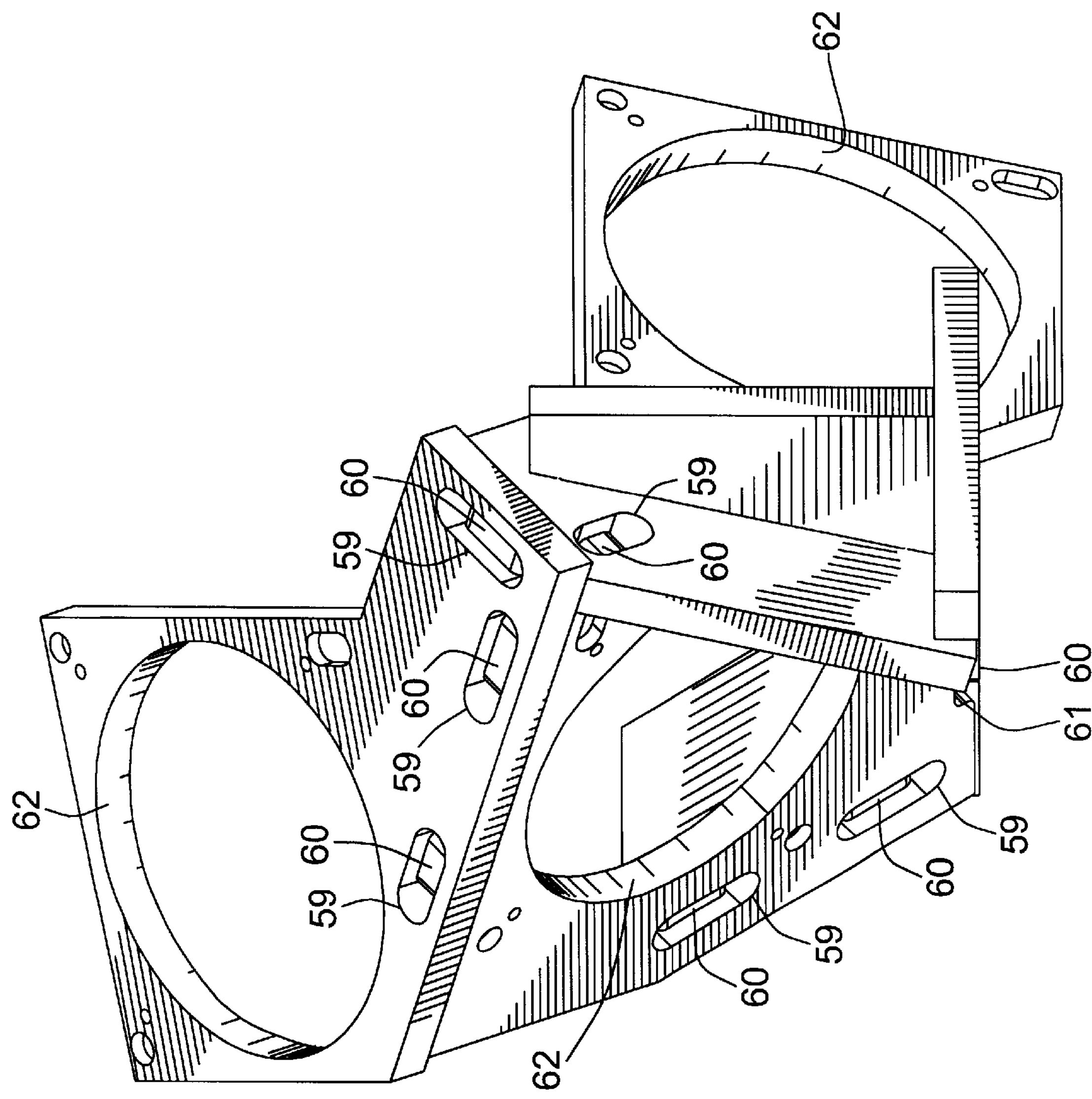
FIG. 7 is a view of the cube corner retroreflector frame taken generally from 7—7 of FIG. 6.

FIG. 7 is a view of the cube corner retroreflector frame taken generally from 7—7 of FIG. 6. To reduce manufacturing cost over the embodiment of FIG. 2, cube corner reflector frame 50 is constructed of several individual tabbed and slotted plates that are machine cut to shape then welded together. Cutting is preferably accomplished by laser or plasma techniques, but abrasive water jet cutting can also be used. Several slots 59 and tabs 60 can be seen. A notch 61 can also be used to locate a tab 60. Such parts are self-locating and self fixturing. Welding in the slots to weld the tabs to the slotted parts pulls the joints together tightly and quite accurately. Such construction techniques are generally well known in the in the art of designing weldments for machine tools and construction equipment, but no prior art has been found suggesting manufacture of a corner cube retroreflector by such method. While such construction techniques are not adequately accurate to mount a mirror directly to the surface, they are accurate enough for adjustably attached mirror housings.

Large holes 62, FIG. 7, allow the mirror housings to project through the frame such that the reflecting faces of the mirrors are approximately flush with the inner surfaces of the frame. This is best seen in FIG. 5 where housing 49' holding mirror 3 extends past frame surface 62 and housing 51' holding mirror 5 extends past frame surface 63.

Recall that obtaining strict parallelism between a beam incoming to a cube corner retroreflector and a beam outgoing from a cube corner retroreflector requires very great accuracy in the forming of the reflective faces of the cube corner apparatus. To achieve intended purpose, the reflecting faces must be perpendicular to each other within exacting tolerances. In the preferred embodiment of the invention, having a welded frame and adjustably mounted mirrors, the inventors are aware of no way to set the reflecting faces of mirrors 3, 4 and 5 orthogonal with sufficient accuracy after installation in the machine tool. The preferred embodiment of the cube corner retroreflector was assembled with the aid of a coordinate measuring machine before installation on the machine tool. The coordinate measuring machine was used to establish a plane at the reflective surface of mirror 4 then with that plane as a reference, the coordinate measuring machine was used to set the reflecting surfaces of mirrors 3 and 5 perpendicular to mirror 4. Further, the coordinate measuring machine was used to set a plane at the reflective surface of mirror 3 then that plane was used to assure the reflective surfaces of mirrors 4 and 5 were perpendicular to mirror 3. Having been thus set and checked, adjusters 57 and 58 of all mirror holders were permanently locked in place.

Referring once more to FIG. 4, in an alternative form of the invention any one of mirrors 3, 4, or 5 can be fixedly and non-adjustably mounted to housing 51 while the other two mirrors are adjustably mounted to housing 51 in the manner previously discussed with FIG. 6. In such form the adjustable mirrors are set perpendicular to the fixed mirror and to each other. Having been thus set and checked, adjusters 57 and 58 of the adjustable mirror holders are locked in place.

It can now be seen by one of ordinary skill in the art that the present invention provides a new and improved cube corner laser beam retroreflector apparatus that will reduce the effect of small deviations in flatness of optical carriage mounting elements and/or linear ways that pitch, yaw and roll the carried retroreflector apparatus. It can also be seen that the corner cube reflective device can consist of three orthogonal removable mirrors. Further, it can be seen that the mirror holding frame for the corner cube retroreflector need not be precisely machined. It can be fabricated of laser or plasma or abrasive water jet cut tabbed and slotted parts that are welded together. Adjustable mirror holders can be mounted on the imprecise, fabricated frame and preset to precise orthogonal relationship to each other before introducing the cube corner retroreflector apparatus into a beam path.

What is claimed is:

1. A cube corner retroreflector apparatus for a beam path external to a laser comprising in combination:

a cube corner retroreflector in the beam path, and attached to a translatable carriage carried on linear ways; and driven by a powered actuator.

2. The combination of claim 1 wherein cube corner retroreflector includes three removable mirrors.

3. The combination of claim 2 wherein the cube corner retroreflector includes a welded frame and three mirror holders, each mirror holder adjustably attached to the welded frame, and each mirror holder housing one of the removable mirrors.

4. The combination of claim 1 wherein the cube corner retroreflector includes a welded frame and three mirror holders, each mirror holder adjustably attached to the welded frame, each mirror holder housing a removable mirror, and each mirror holder being preset and locked in orthogonal relationship to one another before installation of the cube corner retroreflector in the beam path.

5. The combination of claim 1 wherein the cube corner retroreflector includes a welded frame and three mirror holders, the welded frame including plasma, laser or abrasive water jet cut tabbed and slotted flat plates welded together, each mirror holder attached to the welded frame and having an adjustment device for the associated mirror, each mirror holder housing a removable mirror, and each mirror holder being preset to orthogonal relationship to one another and the adjustment devices locked before installation of the cube corner retroreflector in the beam path.

6. The combination of claim 1 wherein the powered actuator is a programmable actuator.

7. The combination of claim 1 wherein the powered actuator is a rotary motor.

8. The combination of claim 1 wherein the powered actuator is a linear servo motor.

9. The combination of claim 1 wherein the powered actuator has associated therewith a translation device for driving the translatable carriage along the linear ways.

10. The combination of claim 9 wherein the translation device is belt driven.

11. The combination of claim 9 wherein the translation device is ballscrew driven.

12. A laser equipped machine tool comprising in combination:

a laser resonator projecting a beam in a beam path external to the laser resonator;

a cube corner retroreflector apparatus in said beam path external to the laser resonator; and the cube corner retroreflector apparatus having three mirrors arranged orthogonally with respect to each other to produce a reflected output beam parallel to said beam path.

13. A laser equipped machine tool comprising in combination:

a laser source having a resonator and projecting a beam in a beam path external to the laser resonator;

a cube corner retroreflector apparatus in said beam path external to the laser resonator;

said cube corner retroreflector apparatus attached to a translatable carriage carried on linear ways; and driven by a powered actuator.

14. The combination of claim 13 wherein cube corner retroreflector includes three removable mirrors.

15. The combination of claim 14 wherein the cube corner retroreflector includes a welded frame and three mirror holders, each mirror holder adjustably attached to the welded frame, and each mirror holder housing one of the removable mirrors.

16. The combination of claim 13 wherein the cube corner retroreflector includes a welded frame and three mirror holders, each mirror holder attached to the welded frame and having an adjustment device for the associated mirror, each mirror holder housing a removable mirror, and each mirror holder being preset to orthogonal relationship to one another and the adjustment devices locked before installation of the cube corner retroreflector in the beam path.

17. The combination of claim 13 wherein the cube corner retroreflector includes a welded frame and three mirror holders, the welded frame including plasma, laser or abrasive water jet cut tabbed and slotted flat plates welded together, each mirror holder attached to the welded frame and having an adjustment device for the associated mirror, each mirror holder housing a removable mirror, and each mirror holder being preset to orthogonal relationship to one another and the adjustment devices locked before installation of the cube corner retroreflector in the beam path.

18. The combination of claim 13 wherein the powered actuator is a programmable actuator.

19. The combination of claim 13 wherein the powered actuator is a rotary motor.

20. The combination of claim 13 wherein the powered actuator is a linear motor.

21. The combination of claim 13 wherein the powered actuator has associated therewith a translation device for driving the translatable carriage along the linear ways.

22. The combination of claim 21 wherein the translation device is belt driven.

23. The combination of claim 21 wherein the translation device is ballscrew driven.

24. A cube corner retroreflector apparatus for a beam path external to a laser comprising in combination:

a welded frame and three mirror holders;

the welded frame comprising plasma, laser, or abrasive water jet cut tabbed and slotted flat plates welded together;

each mirror holder adjustably attached to the welded frame; and each mirror holder housing a removable mirror.

25. The combination of claim 24 wherein the mirrors are arranged to define a central mirror flanked by the other two mirrors, and the frame generally opposite the center mirror is cut away for introduction of an incoming laser beam.

26. A cube corner retroreflector apparatus for a beam path external to a laser comprising in combination:

a welded frame comprising plasma, laser, or abrasive water jet cut tabbed and slotted flat plates welded together and three mirror holders;

each mirror holder adjustably attached to the welded frame, each mirror holder housing a removable mirror, each mirror holder preset to orthogonal relationship to one another, and adjusting devices locked before installation of the cube corner retroreflector in the beam path.

27. The combination of claim 26 wherein a corner of the frame generally adjacent to first and third mirror of the cube corner retroreflector and generally opposite the center mirror is cut away for introduction of an incoming laser beam.

28. A cube corner retroreflector apparatus for a beam path external to a laser comprising in combination;

a mirror holder frame;

three mirror holders;

one mirror holder fixedly attached to the mirror holder frame;

two mirror holders adjustably attached to the mirror holder frame;

each mirror holder housing a removable mirror, the adjustably attached mirror holders preset to orthogonal relationship to the fixedly attached mirror holder and to one another and;

adjusting devices locked before installation of the cube corner retroreflector in the beam path.

29. The combination of claim 28 wherein a corner of the mirror holder frame generally adjacent to first and third mirror of the cube corner retroreflector and generally opposite the center mirror is cut away for introduction of an incoming laser beam.

30. A cube corner retroreflector apparatus for a beam path external to a laser comprising in combination:

a mirror holder frame, three mirror holders, each mirror holder adjustably attached to the mirror holder frame, each mirror holder housing a removable mirror, each mirror holder preset to orthogonal relationship to one another, and adjusting devices locked before installation of the cube corner retroreflector in the beam path.

31. The combination of claim 30 wherein a corner of the mirror holder frame generally adjacent to first and third mirror of the cube corner retroreflector and generally opposite the center mirror is cut away for introduction of an incoming laser beam.

32. A method of assembling and adjusting a cube corner retroreflector comprising the steps of:

providing a mirror holder frame having mounting positions for three mirrors;

mounting three mirrors in the mirror frame in generally orthogonal relationship, at least two of the mirrors being in adjustable mounts;

placing the assembled cube corner retroreflector in a coordinate measuring machine and establishing a plane at the reflective surface of one of the mirrors as a reference;

utilizing the coordinate measuring machine and the mirror adjustment mechanisms to set the reflecting surfaces of the other mirrors perpendicular to the reference; and locking the adjustment mechanisms with the mirrors set in mutually orthogonal relationship.

* * * * *